United States Patent
Iyengar

(10) Patent No.: US 7,836,248 B2
(45) Date of Patent: Nov. 16, 2010

(54) METHODS AND SYSTEMS FOR MANAGING PERSISTENT STORAGE OF SMALL DATA OBJECTS

(75) Inventor: Arun Kwangil Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1710 days.

(21) Appl. No.: 10/629,284

(22) Filed: Jul. 29, 2003

(65) Prior Publication Data

US 2005/0027933 A1  Feb. 3, 2005

(51) Int. Cl.
G06F 12/00 (2006.01)

(52) U.S. Cl. ..................................... 711/113
(58) Field of Classification Search .................. None
See application file for complete search history.

(56) References Cited

U.S. PATENT DOCUMENTS

| | | | | |
|---|---|---|---|---|
| 5,802,599 | A * | 9/1998 | Cabrera et al. | 711/170 |
| 6,804,761 | B1 * | 10/2004 | Chen et al. | 711/170 |
| 6,915,307 | B1 * | 7/2005 | Mattis et al. | 707/103 R |
| 2002/0032691 | A1 * | 3/2002 | Rabii et al. | 707/200 |
| 2004/0172507 | A1 * | 9/2004 | Garthwaite | 711/159 |

OTHER PUBLICATIONS

J. Hennessy et al., "Computer Architecture: A Quantitative Approach," Chapter 6 (6.1, 6.2, 6.10 and 6.11), Morgan Kauffmann Publishers, pp. 485-495 and pp. 553-557, 1996.

* cited by examiner

*Primary Examiner*—Tuan V Thai
*Assistant Examiner*—Duc T Doan
(74) *Attorney, Agent, or Firm*—Anne V. Dougherty; Ryan, Mason & Lewis, LLP

(57) ABSTRACT

Techniques are disclosed for managing storage of objects of sizes smaller than a storage transfer unit in a computer system. A plurality of storage transfer units are maintained in a first storage medium (e.g., disk storage) organized by a quantity of free space in a storage transfer unit. A cache is maintained in a second storage medium (e.g., main memory), the cache including a copy of at least one of the plurality of storage transfer units. In response to a request to store an object of a size less than a storage transfer unit, the technique searches for a cached storage transfer unit with sufficient free space to store the object. If no such cached storage transfer unit can be found, the technique identifies an uncached storage transfer unit with sufficient free space to store the object and stores a copy of the identified storage transfer unit in the cache. The object is stored in the identified storage transfer unit by modifying at least one data structure in the cache and subsequently writing a cached copy of the storage transfer unit to the first storage medium.

28 Claims, 5 Drawing Sheets

DELETED OBJECT LIST: 5, 8, 2

METHODS AND SYSTEMS FOR MANAGING PERSISTENT STORAGE OF SMALL DATA OBJECTS

FIELD OF THE INVENTION

The present invention relates to techniques for managing the storage of data objects and, more particularly, to methods and systems for managing the persistent storage of small data objects.

BACKGROUND OF THE INVENTION

A key problem in data storage management is how to efficiently manage objects which are relatively small but need to be stored persistently, such as in disk storage rather than in main memory only. Traditional disk storage systems are disclosed in J. Hennessy et al., "Computer Architecture: A Quantitative Approach," Chapter 6, Morgan Kaufmann, 1996, the disclosure of which is incorporated by reference herein.

One of the key issues for storing such objects is that the minimum unit of transfer, known as a sector, is often much larger than the minimum object size. By way of example, a sector size may be more than a factor of two larger than some objects. This means that the disk storage system will transfer sectors between disk and main memory. When an object is much smaller than a sector, the disk storage system does not have a method for transferring just the object. The disk storage system has to transfer the entire sector (or sectors if the object is on a sector boundary) containing the object in order to access just the object.

Thus, a need exists for techniques that efficiently manage small objects in storage transfer units, such as sectors.

SUMMARY OF THE INVENTION

The present invention provides techniques that efficiently manage small objects in storage transfer units, such as sectors.

In one aspect of the invention, a technique for managing storage of objects of sizes smaller than a storage transfer unit in a computer system comprises the following steps. A plurality of storage transfer units are maintained in a first storage medium organized by a quantity of free space in a storage transfer unit. A cache is maintained in a second storage medium, the cache comprising a copy of at least one of said plurality of storage transfer units. In response to a request to store an object of a size less than a storage transfer unit, the technique searches for a cached storage transfer unit with sufficient free space to store the object. If no such cached storage transfer unit can be found, the technique identifies an uncached storage transfer unit with sufficient free space to store the object and stores a copy of the identified storage transfer unit in the cache. The object is stored in the identified storage transfer unit by modifying at least one data structure in the cache and subsequently writing a cached copy of the storage transfer unit to the first storage medium.

The first storage medium may comprise disk storage. The second storage medium may comprise main memory.

The step of searching for a cached storage transfer unit further may comprise identifying a cached storage transfer unit with sufficient free space to store the object giving preference to such cached storage transfer units with less free space. The step of searching for a cached storage transfer unit may further comprise identifying a cached storage transfer unit with a least amount of free space sufficient to store the object.

The step of identifying an uncached storage transfer unit may further comprise identifying an uncached storage transfer unit with sufficient free space giving preference to storage transfer units which minimize fragmentation. The step of identifying an uncached storage transfer unit may still further comprise giving preference to storage transfer units with more free space. The step of identifying an uncached storage transfer unit may yet further comprise identifying a storage transfer unit with a most free space.

The inventive technique may further comprise the following steps. At least one list of storage transfer units is maintained. At least one tail pointer to a plurality of contiguous unallocated storage transfer units is maintained. Then, the step of identifying an uncached storage transfer unit further may comprise the steps of searching for an uncached storage transfer unit on the at least one list with sufficient space, and if such an uncached storage transfer unit can not be located, identifying an unallocated storage transfer unit from the at least one tail pointer. The inventive technique may also comprises the step of maintaining a plurality of lists of storage transfer units organized by a quantity of free space in a storage transfer unit. Also, the inventive technique may comprise the step of maintaining at least one tail pointer to a plurality of contiguous unallocated storage transfer units.

Further, a cached copy of a storage transfer unit may be written to the first storage medium in response to at least one of: (i) an object in the storage transfer unit being updated; (ii) a number of changed bytes in the storage transfer unit exceeding a threshold; (iii) a number of changed objects in the storage transfer unit exceeding a threshold; and (iv) the cached copy being about to be purged from the cache. The cached copy may be about to be purged from the cache as a result of at least one of a cache replacement policy and the computer system being about to go down. An application program may write at least one storage transfer unit to disk in a transactional manner. A storage transfer unit may comprise a sector.

In a second aspect of the invention, a technique for maintaining a plurality of objects in a storage transfer unit comprises the following steps. An object position in the storage transfer unit is identified by an object offset in the storage transfer unit. In response to a request to one of access and update a storage transfer unit, the storage transfer unit is copied so that different objects are copied into different buffers. At least one update to at least one object in the storage transfer unit is performed by modifying at least one buffer. After the at least one update has occurred, the storage transfer unit is updated from the at least one buffer.

The inventive technique may further comprise the following steps. When an object which does not have a highest offset is deleted, the offset is added to a list. An allocation request is satisfied by using an offset from the list. If an offset is not reused by the time the storage transfer unit is updated from the at least one buffer, a placeholder is stored on the storage transfer unit indicating the object has been deleted. Still further, the technique may comprise, in response to an object update which would cause a storage transfer unit to overflow, moving the object to a new storage transfer unit and storing a forwarding pointer in the previous storage transfer unit.

The storage transfer unit may be maintained on disk and the at least one buffer may be maintained in main memory. The step of updating the storage transfer unit from the at least one buffer may further comprise copying a plurality of objects from buffers to the storage transfer unit in a contiguous area so that free space in the storage transfer unit is contiguous. The storage transfer unit may comprise a sector.

Further, the inventive technique may comprise maintaining a number of free bytes in the storage transfer unit. The step of performing at least one update may further comprise using the number of free bytes in the storage transfer unit to prevent overflow. Also, the copy of at least one of the plurality of storage transfer units included in the cache may be one of a partial copy and an inexact copy.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative disk storage system architecture. However, it is to be understood that the present invention is not limited to such a storage architecture. Rather, the invention is more generally applicable to any storage environment in which it would be desirable to efficiently manage storage of objects that are small relative to a storage transfer unit. Further, it is to be understood that the term "sector" as used herein refers not only to disk sectors but more generally to any fixed unit of transfer between two different storage media. Also, it is to be understood that the term "object" as used herein refers to any form of data. A "small object" refers to an object smaller than one sector.

Figure 1:
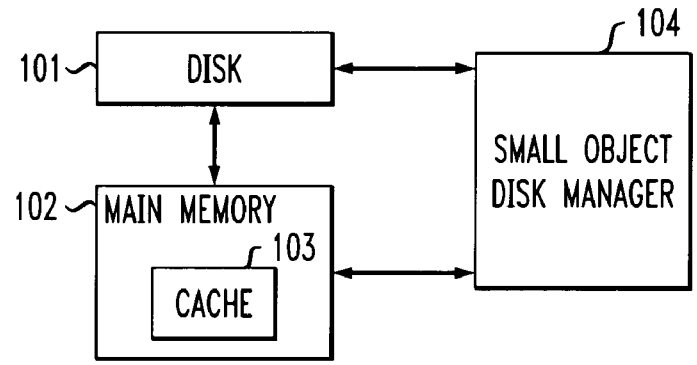
FIG. 1 is a block diagram illustrating a small object disk manager and a storage environment in which it may operate, according to an embodiment of the invention.

Referring initially to FIG. 1, a block diagram illustrates a small object disk manager and a storage environment in which it may operate, according to an embodiment of the invention. Disk storage 101 includes a plurality of sectors. A sector is the smallest unit that can be transferred from disk 101 or stored on the disk at a time. Main memory storage 102 includes a cache 103. Cache 103 is used to cache the contents of recently accessed sectors for faster access. Main memory storage 102 can generally be accessed with considerably less overhead than disk storage 101. Therefore, performance advantages are incurred by caching the contents of frequently accessed sectors.

A small object disk manager (SODM) 104 is the system which efficiently manages persistent objects of sizes less than a sector. SODM 104 maintains lists of sectors organized by the amount of free storage in a sector. In doing so, SODM 104 keeps track of the amount of free storage within a sector.

Figure 2:
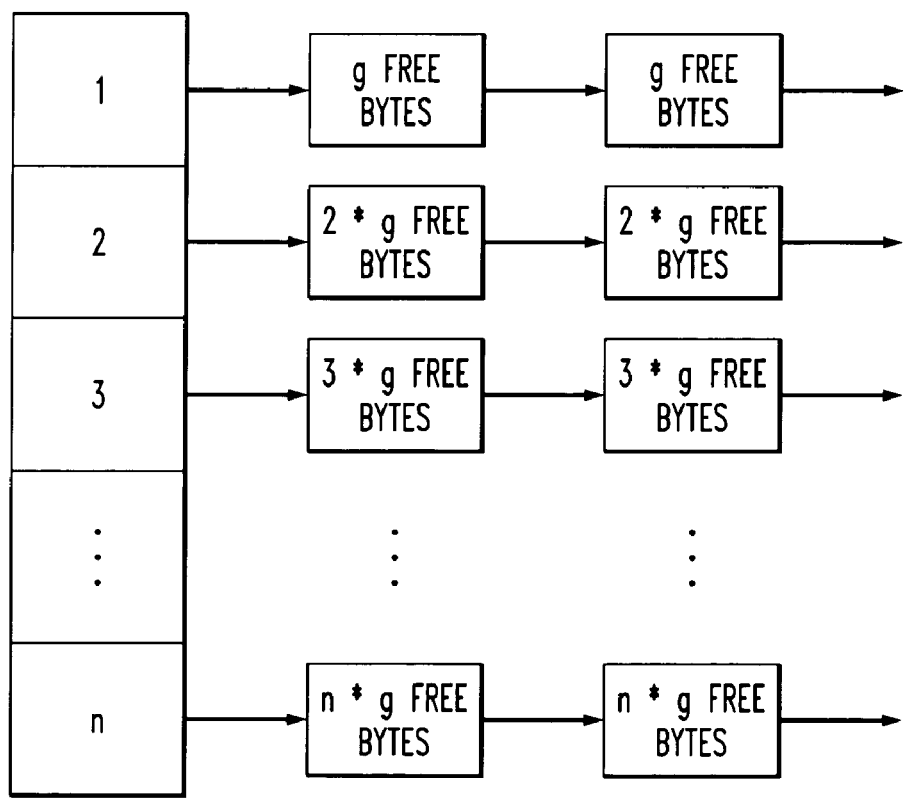
FIG. 2 is a diagram illustrating a methodology for maintaining lists of sectors organized by size, according to an embodiment of the invention.

Referring now to FIG. 2, a diagram illustrates a methodology for maintaining lists of sectors organized by size, according to an embodiment of the invention. That is, FIG. 2 shows one method by which SODM 104 can manage sectors. In this example, there are n free lists. List I for $1 \leq I \leq n$ comprises sectors with I*g free bytes of storage, where g is a positive integer known as a grain size. Sectors on free list n have a maximum number of free bytes.

Initially, no sectors are allocated and the lists are empty (in an alternative embodiment, one or more sectors may be pre-allocated from one or more tails at initialization time). For a disk, a pointer known as a tail pointer points to a contiguous region of unallocated sectors. There may be multiple tail pointers. For example, if there are multiple disks, each disk might have a tail pointer.

When a request can not be satisfied from a sector on a free list, the request may be satisfied by a sector referenced by a tail pointer. The tail pointer is then incremented to point to the next unallocated sector. When an allocation request can not be satisfied from a free list (e.g., such as when all free lists are empty), the request is satisfied from a tail and the sector is added to a free list. This is how the free lists become populated. SODM 104 will normally try to satisfy an allocation request from a sector on a free list before trying to allocate a new sector by advancing a tail.

Figure 3:
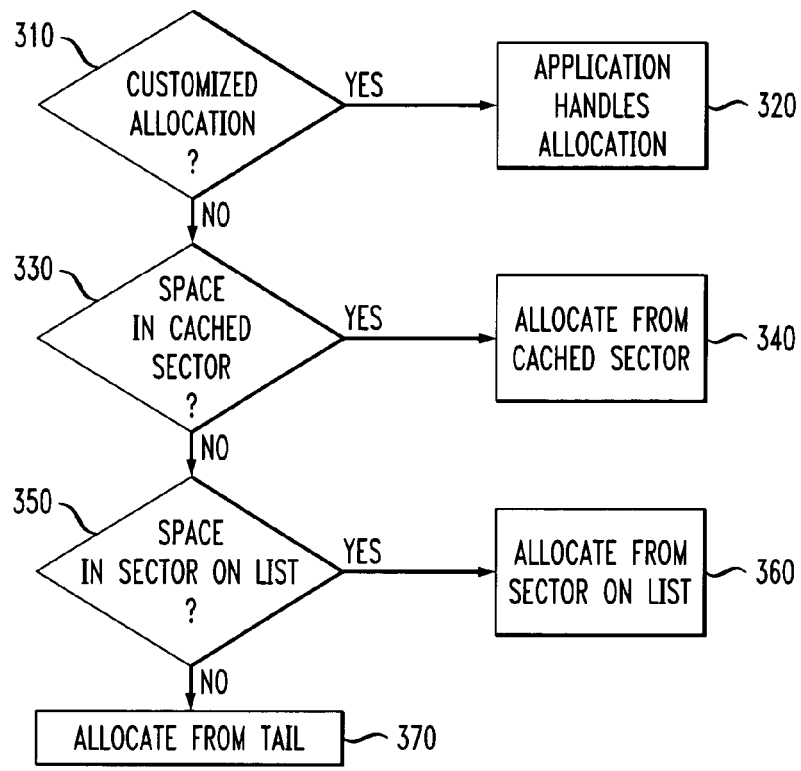
FIG. 3 is a flow diagram illustrating a methodology for storing a new persistent object, according to an embodiment of the invention.

Referring now to FIG. 3, a flow diagram illustrates a methodology for storing a new persistent object, according to an embodiment of the invention. That is, FIG. 3 shows an illustrative method for satisfying an allocation request for a new object smaller than a sector size. This methodology is performed under control of SODM 104.

In step 310, it is determined if the request is for customized allocation. If so, the application (e.g., one or more computer programs utilizing the disk storage system to execute their functions) handles the request in step 320. The application may invoke application programming interface (API) functions on SODM 104 to perform customized allocation. For example, an application might indicate that several objects should be stored on the same sector for better locality of reference. This would reduce the number of disk accesses for objects which are likely to be accessed in close temporal locality to each other. The application could also specify that specific objects be mapped to specific sectors. This could also improve performance by achieving better locality.

If the request is not for customized allocation, it is determined in step 330 whether there is space for the object in a cached sector, i.e., a sector which has been copied to the cache with sufficient free space. SODM 104 maintains an ordered data structure containing the number of free bytes in cached sectors, fb. The data structure fb can be implemented in several ways, such as a balanced tree which is efficient or a list which is not as efficient. If there are multiple cached sectors with sufficient free space, several methods may be used to select an appropriate sector. One method is to select a sector with the least free space sufficient to accommodate the new object. This approach is known as a best fit approach.

If a sector is found with sufficient free space, processing continues to step 340.

Figure 4:
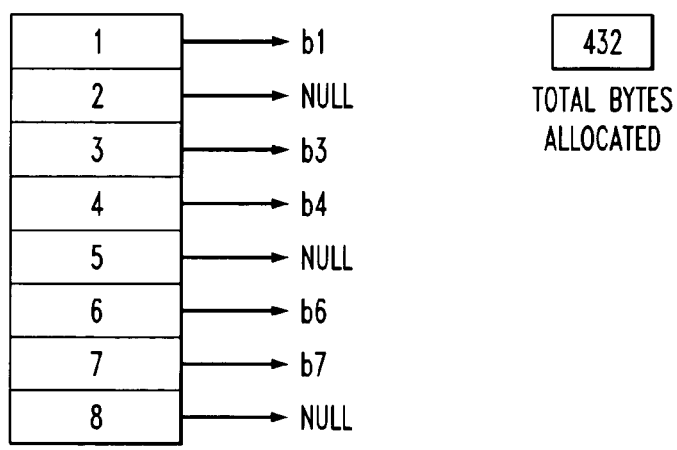
FIG. 4 is a diagram illustrating a methodology for storing a cached copy of a sector, according to an embodiment of the invention.

Referring now to FIG. 4, an example of how a cached sector might be represented in memory is shown. In this figure there are 8 (although the invention is not limited thereto) pointers to buffers. Buffers b1, b3, b4, b6, and b7 contain objects. Pointers 2, 5, and 8 are null because the objects they previously pointed to have been deleted. In this particular example, a buffer for the new object could be created (or an existing buffer could be reused) and stored in position 5. Position 5 would be removed from the deleted object list. The total allocated bytes would be reduced by the space taken up by the new object, and fb would be updated.

If, on the other hand, the deleted object list were empty and pointers 2, 5, and 8 pointed to buffers containing objects, an additional pointer 9 would be created to point to the buffer for the new object.

Returning now to FIG. 3, if a cached sector with sufficient free space is not found in step 330, processing continues to step 350. In step 350, SODM 104 attempts to locate an uncached sector with sufficient space for the new object. SODM 104 does so by examining at least one free list (free lists are illustrated in FIG. 2). Free lists are maintained on disk for persistence. They may also be cached in main memory for better performance. If they are cached in main memory, step 350 can generally execute more quickly.

If there are multiple cached sectors with sufficient free space, several methods may be used to select an appropriate sector. One method is to select a sector on a free list with the most free space. Since free lists are organized by size, this can be done by examining free lists starting from the one storing the largest blocks and moving downwards until either a non-empty list is found or a free list is reached with insufficient space to store the new object (in which case a tail is examined to obtain a sector with enough free space).

If a sector with sufficient space is identified in step 350, the sector is cached in main memory in step 360. The method for doing so is similar to that in step 506 of FIG. 5 and will be described shortly. Space is then allocated for the new object in the manner described for step 340. Since the newly cached sector will not have anything on its deleted object list, the new object will be stored as the last buffer associated with the sector.

If an appropriate sector is not identified in step 350, an empty sector is allocated from a tail in step 370. The tail pointer corresponding to the allocation request is then modified to point to the next unallocated sector. Performing allocations from a tail too frequently can fragment disks and require more disk space for storage. By only resorting to tail allocations as a last step, the approach in FIG. 3 minimizes fragmentation.

Figure 5:
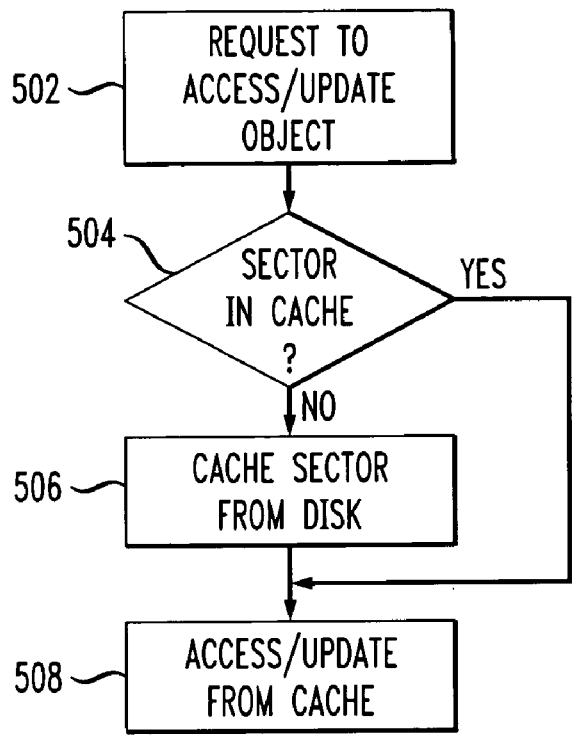
FIG. 5 is a flow diagram illustrating a methodology for accessing or updating an object, according to an embodiment of the invention.

Referring now to FIG. 5, a flow diagram illustrates a methodology for accessing or updating an object, according to an embodiment of the invention. This methodology is performed under control of SODM 104.

In step 502, a request to access/update an object is received. An object may be identified by its sector identification (ID) and object offset within its sector. For example, if an object is the 10th object in sector x, then its object offset is 10. In step 504, it is determined if the sector is already cached. If so, then processing continues to step 508, wherein the access or update is performed.

As an example of an access, in order to access the 3rd object of the cached sector depicted in FIG. 4, the contents of buffer b3 would be returned.

As an example of an update, in order to update the 6th object of the cached sector depicted in FIG. 4 with a new object which is not big enough to overflow the sector, buffer b6 is replaced with a buffer containing the new object. In some cases, the old buffer can be reused and/or resized to contain the new object.

Figure 6:
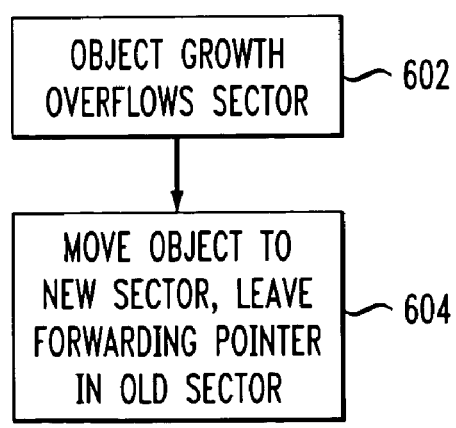
FIG. 6 is a flow diagram illustrating a methodology for handling a sector overflow, according to an embodiment of the invention.

As another example of an update, suppose that the 6th object of the cached sector depicted in FIG. 4 is updated to a size which would overflow the sector. FIG. 6 is a flow diagram illustrating a methodology for handling a sector overflow, according to an embodiment of the invention. This methodology is performed under control of SODM 104. If it is determined in step 602 that the growth of an object overflows the sector, then a new sector with sufficient space is located for the updated object, and the updated object is stored in the new sector in step 604. This process would be similar to that previously mentioned for FIG. 3, starting at step 330. The old location for the object may then be replaced by a forwarding pointer of the format depicted in FIG. 7. The negative tag indicates a forwarding pointer as opposed to object data as depicted in FIG. 8. The forwarding pointer contains the new location for the object. That way, the object can be located from its old location.

Returning to FIG. 5, if it is determined in step 504 that the sector is not cached, the sector is cached in step 506. FIG. 9 shows a method by which a sector on disk might be arranged. A header might contain information such as the number of objects in the sector and the number of free bytes. Other information might be contained in a header as well. After the header, data corresponding to the objects would be stored. An object would be of the form depicted in FIG. 8, while a forwarding pointer would be of the form depicted in FIG. 7. Size headers for objects allow SODM 104 to determine when one object ends and another begins. Forwarding pointers are of a fixed size known by SODM 104.

In some situations, it may not be necessary to cache all of a sector. In other situations, it may be acceptable to cache an inexact copy of a sector.

Figure 7:
FIG. 7 is a diagram illustrating a methodology for storing a forwarding pointer for an object which has been moved to a new disk location, according to an embodiment of the invention.
Figure 8:
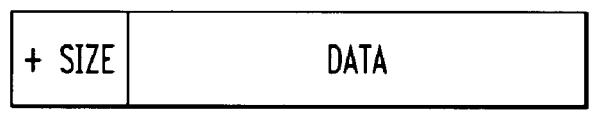
FIG. 8 is a diagram illustrating a methodology for storing an object within a sector, according to an embodiment of the invention.
Figure 9:
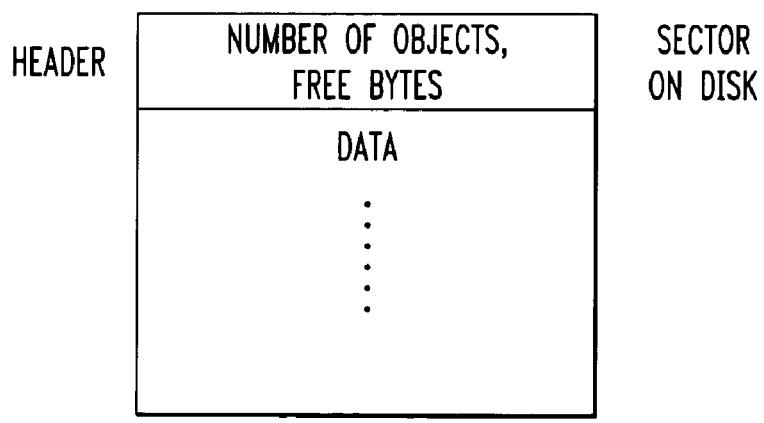
FIG. 9 is a diagram illustrating a methodology for maintaining a multiblock sector, according to an embodiment of the invention.

SODM 104 reads in the sector which might be of the format depicted in FIGS. 7, 8 and 9 and caches the sector in main memory. The cached main memory format may be similar to the one depicted in FIG. 4.

SODM 104 might also maintain other information about cached sectors, such as information correlated with how frequently the sector is accessed. This information could be used to determine which cached object to throw out when the cache overflows (i.e., a cache replacement policy). One such policy is LRU, or least recently used. Under this policy, the cached object accessed the least recently is replaced. Other replacement policies could be used as well.

Figure 10:
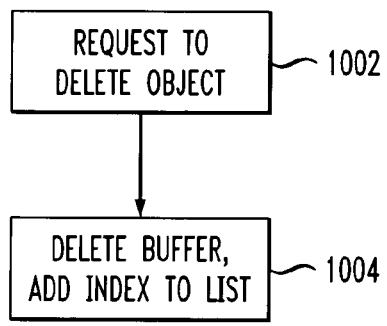
FIG. 10 is a flow diagram illustrating a methodology for deleting an object, according to an embodiment of the invention.

Referring now to FIG. 10, a flow diagram illustrates a methodology for deleting an object, according to an embodiment of the invention. That is, FIG. 10 depicts an illustrative method for deleting an object, which is a special case of step 508 of FIG. 5 where the update is a deletion operation. This methodology is performed under control of SODM 104.

Thus, in step 1002, a request to delete an object is received. Then, step 1004 is performed. To illustrate step 1004, consider FIG. 4. Suppose that the request was to delete the 6th object of the sector. Then, buffer b6 would be reclaimed (or possibly reused), and the 6th pointer would become null. Also, 6 would be added to the deleted object list.

Figure 11:
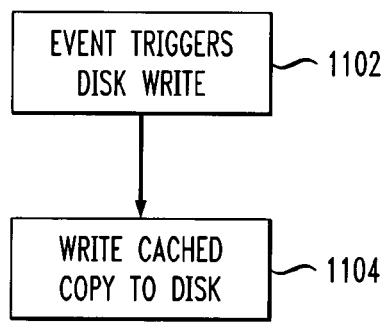
FIG. 11 is a flow diagram illustrating a methodology for writing a cached sector to disk, according to an embodiment of the invention.

In the previous examples, modifications to sectors were performed in main memory via cache 103. At some point, it may become desirable to write a cached sector which has changed back to disk. This process is performed under control of SODM 104 and illustrated in FIG. 11. In step 1102, an event triggers a write of a sector to disk. SODM 104 can be configured to recognize one or more events which could trigger a write of a sector to disk. These include but are not limited to the following:

1. A sector is written to disk anytime an object changes. This approach maintains consistency of disk and memory, and little if any data will be lost in the event of a system failure. The drawback is that high overhead may be incurred due to frequent writes.

2. A sector is only written to disk when a cached sector is about to be purged from the cache, such as due to a cache replacement policy or before a system shutdown. This can have considerably less overhead than 1, but it can also result in significantly outdated disk memory in the event of a system failure.

3. The application controls writing to the disk. The application can do so in several ways, one of them being transactional. In transactional updates, the application designates at least one sector that should not be written to disk before the transaction commits. At commit time, the at least one sector is written to disk.

4. A sector is written to disk after the number of changed objects exceeds a threshold.

5. A sector is written to disk after the number of changed bytes exceeds a threshold.

In step 1104, a cached copy of the sector is written to disk. The cached copy might be of the form shown in FIG. 4. When buffers corresponding to objects are copied back to disk, deleted objects may be ignored. Objects and forwarding pointers may be stored contiguously on disk. That way, the free space may be maintained contiguously, minimizing fragmentation.

Figure 12:
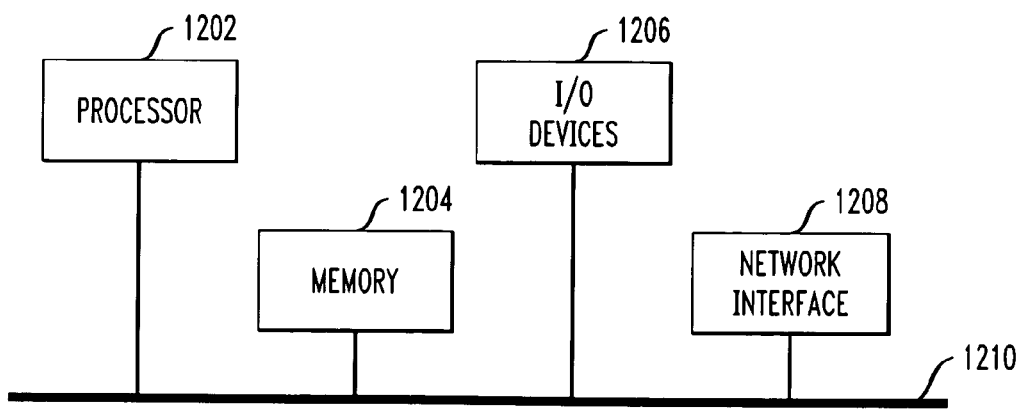
FIG. 12 is a block diagram illustrating an illustrative hardware implementation of a computing system in accordance with which one or more components/methodologies of a small object disk management system may be implemented, according to an embodiment of the invention.

Referring finally to FIG. 12, a block diagram illustrates an illustrative hardware implementation of a computing system in accordance with which one or more components/methodologies of a small object disk management system (e.g., components/ methodologies described in the context of FIGS. 1 through 11) may be implemented, according to an embodiment of the present invention. For instance, the computing system in FIG. 12 may implement the components shown in FIG. 1 including disk 101, main memory 102, cache 103 and SODM 104, and implement the methodologies performed by SODM 104 as described herein.

It is to be understood that the individual components/methodologies may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 1202, a memory 1204, I/O devices 1206, and a network interface 1208, coupled via a computer bus 1210 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Thus, memory 1204 may generally represent disk 101, main memory 102 and cache 103.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing storage of objects of sizes smaller than a storage transfer unit in a computer system, comprising the steps of:

maintaining a plurality of storage transfer units in a first storage medium organized by a quantity of free space in a storage transfer unit;

maintaining in a second storage medium a cache comprising a copy of at least one of said plurality of storage transfer units;

in response to a request to store an object of a size less than a storage transfer unit:

searching for a cached storage transfer unit with sufficient free space to store the object;

if no such cached storage transfer unit can be found, identifying an uncached storage transfer unit with sufficient free space to store the object and storing a copy of the identified storage transfer unit in the cache; and storing the object in the identified storage transfer unit by modifying at least one data structure in the cache and subsequently writing a cached copy of the storage transfer unit to the first storage medium.

2. The method of claim 1, wherein the first storage medium comprises disk storage.

3. The method of claim 1, wherein the second storage medium comprises main memory.

4. The method of claim 1, wherein the step of searching for a cached storage transfer unit further comprises identifying a cached storage transfer unit with sufficient free space to store the object giving preference to such cached storage transfer units with less free space.

5. The method of claim 4, wherein the step of searching for a cached storage transfer unit further comprises identifying a cached storage transfer unit with a least amount of free space sufficient to store the object.

6. The method of claim 1, wherein the step of identifying an uncached storage transfer unit further comprises identifying an uncached storage transfer unit with sufficient free space giving preference to storage transfer units which minimize fragmentation.

7. The method of claim 1, wherein the step of identifying an uncached storage transfer unit further comprises giving preference to storage transfer units with more free space.

8. The method of claim 7, wherein the step of identifying an uncached storage transfer unit further comprises identifying a storage transfer unit with a most free space.

9. The method of claim 1, further comprising the steps of:
maintaining at least one list of storage transfer units;
maintaining at least one tail pointer to a plurality of contiguous unallocated storage transfer units;
wherein the step of identifying an uncached storage transfer unit further comprises the steps of searching for an uncached storage transfer unit on the at least one list with sufficient space, and if such an uncached storage transfer unit can not be located, identifying an unallocated storage transfer unit from the at least one tail pointer.

10. The method of claim 1, further comprising the step of maintaining a plurality of lists of storage transfer units organized by a quantity of free space in a storage transfer unit.

11. The method of claim 1, further comprising the step of maintaining at least one tail pointer to a plurality of contiguous unallocated storage transfer units.

12. The method of claim 1, wherein a cached copy of a storage transfer unit is written to the first storage medium in response to at least one of: (i) an object in the storage transfer unit being updated; (ii) a number of changed bytes in the storage transfer unit exceeding a threshold; (iii) a number of changed objects in the storage transfer unit exceeding a threshold; and (iv) the cached copy being about to be purged from the cache.

13. The method of claim 1, wherein an application program writes at least one storage transfer unit to disk in a transactional manner.

14. The method of claim 12, wherein the cached copy is about to be purged from the cache as a result of at least one of a cache replacement policy and the computer system being about to go down.

15. The method of claim 1, wherein a storage transfer unit comprises a sector.

16. A method of maintaining a plurality of objects in a storage transfer unit, comprising the steps of:
identifying an object position in the storage transfer unit by an object offset in the storage transfer unit;
in response to a request to one of access and update a storage transfer unit, copying the storage transfer unit so that different objects are copied into different buffers;
performing at least one update to at least one object in the storage transfer unit by modifying at least one buffer; and
after the at least one update has occurred, updating the storage transfer unit from the at least one buffer.

17. The method of claim 16, wherein the copy of at least one of the plurality of storage transfer units included in the cache is one of a partial copy and an inexact copy.

18. The method of claim 16, further comprising the steps of:
when an object which does not have a highest offset is deleted, adding the offset to a list;
satisfying an allocation request by using an offset from the list; and
if an offset is not reused by the time the storage transfer unit is updated from the at least one buffer, storing a placeholder on the storage transfer unit indicating the object has been deleted.

19. The method of claim 16, further comprising the step of:
in response to an object update which would cause a storage transfer unit to overflow, moving the object to a new storage transfer unit and storing a forwarding pointer in the previous storage transfer unit.

20. The method of claim 16, wherein the storage transfer unit is maintained on disk and the at least one buffer is maintained in main memory.

21. The method of claim 16, wherein the step of updating the storage transfer unit from the at least one buffer further comprises copying a plurality of objects from buffers to the storage transfer unit in a contiguous area so that free space in the storage transfer unit is contiguous.

22. The method of claim 16, wherein the storage transfer unit comprises a sector.

23. The method of claim 16, further comprising the step of maintaining a number of free bytes in the storage transfer unit.

24. The method of claim 23, wherein the step of performing at least one update further comprises using the number of free bytes in the storage transfer unit to prevent overflow.

25. Apparatus for managing storage of objects of sizes smaller than a storage transfer unit in a computer system, comprising:
at least one processor operative to: (i) maintain a plurality of storage transfer units in a first storage medium organized by a quantity of free space in a storage transfer unit; (ii) maintain in a second storage medium a cache comprising a copy of at least one of said plurality of storage transfer units; (iii) in response to a request to store an object of a size less than a storage transfer unit: searching for a cached storage transfer unit with sufficient free space to store the object; if no such cached storage transfer unit can be found, identifying an uncached storage transfer unit with sufficient free space to store the object and storing a copy of the identified storage transfer unit in the cache; and storing the object in the identified storage transfer unit by modifying at least one data structure in the cache and subsequently writing a cached copy of the storage transfer unit to the first storage medium.

26. Apparatus for maintaining a plurality of objects in a storage transfer unit, comprising:
at least one processor operative to: (i) identify an object position in the storage transfer unit by an object offset in the storage transfer unit; (ii) in response to a request to one of access and update a storage transfer unit, copy the storage transfer unit so that different objects are copied into different buffers; (iii) perform at least one update to at least one object in the storage transfer unit by modifying at least one buffer; and (iv) after the at least one update has occurred, update the storage transfer unit from the at least one buffer.

27. An article of manufacture for managing storage of objects of sizes smaller than a storage transfer unit in a computer system, comprising a machine readable medium containing one or more programs which when executed implement the steps of:
maintaining a plurality of storage transfer units in a first storage medium organized by a quantity of free space in a storage transfer unit;

maintaining in a second storage medium a cache comprising a copy of at least one of said plurality of storage transfer units;

in response to a request to store an object of a size less than a storage transfer unit:

searching for a cached storage transfer unit with sufficient free space to store the object;

if no such cached storage transfer unit can be found, identifying an uncached storage transfer unit with sufficient free space to store the object and storing a copy of the identified storage transfer unit in the cache; and storing the object in the identified storage transfer unit by modifying at least one data structure in the cache and subsequently writing a cached copy of the storage transfer unit to the first storage medium.

28. An article of manufacture for maintaining a plurality of objects in a storage transfer unit, comprising a machine readable medium containing one or more programs which when executed implement the steps of:

identifying an object position in the storage transfer unit by an object offset in the storage transfer unit;

in response to a request to one of access and update a storage transfer unit, copying the storage transfer unit so that different objects are copied into different buffers;

performing at least one update to at least one object in the storage transfer unit by modifying at least one buffer; and after the at least one update has occurred, updating the storage transfer unit from the at least one buffer.

* * * * *